2 Sheets—Sheet 1.

J. BARNES.
Harvester.

No. 45,383.

Patented Dec. 13, 1864.

Attest.
Snowden Bell
Theodore Lang

Inventor.
Jno Barnes
by his atty
Baldwin & Son

J. BARNES.
Harvester.
No. 45,383.
2 Sheets—Sheet 2.
Patented Dec. 13, 1864.
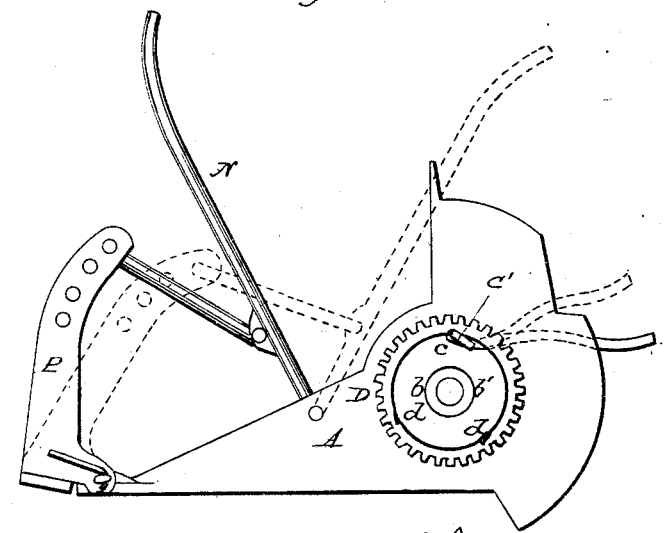
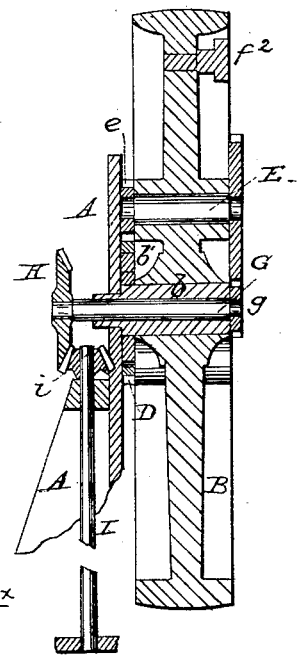
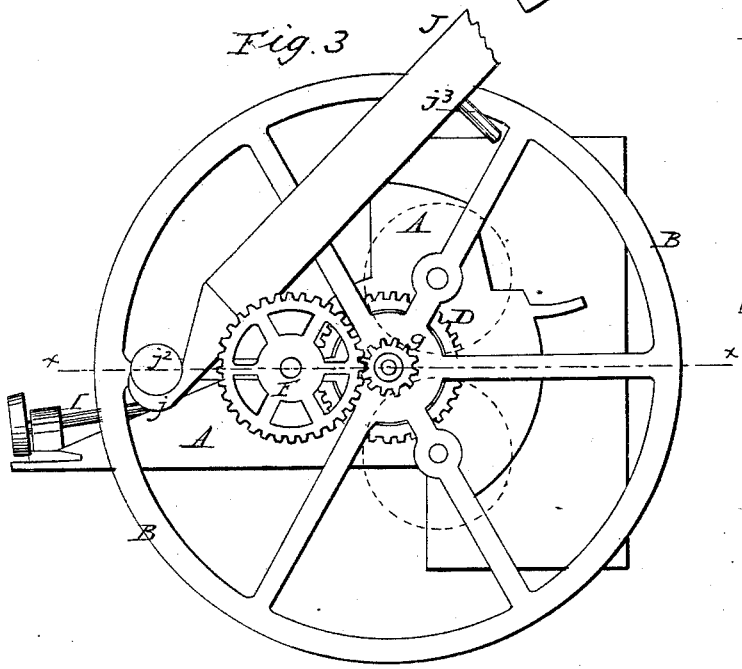
Attest.
Inventor.

UNITED STATES PATENT OFFICE.

JOHN BARNES, OF ROCKFORD, ILLINOIS.

IMPROVEMENT IN HARVESTERS.

Specification forming part of Letters Patent No. 45,383, dated December 13, 1864.

*To all whom it may concern:*

Be it known that I, JOHN BARNES, of Rockford, in the county of Winnebago and State of Illinois, have invented a new and useful Improvement in Harvesters, of which the following is a full, clear, and exact description, reference being had to the accompanying drawings, which make part of this specification, and in which—

Figure 1:
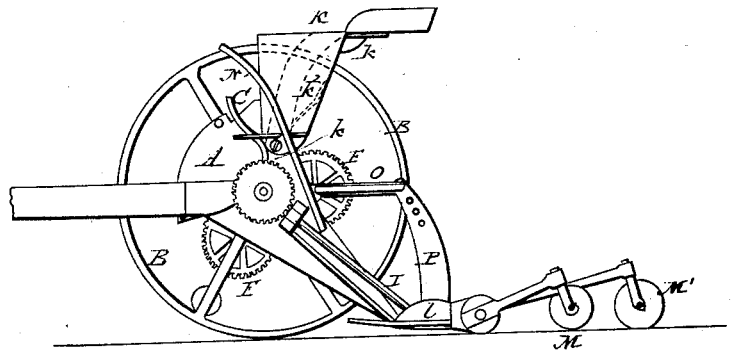
Figure 2:
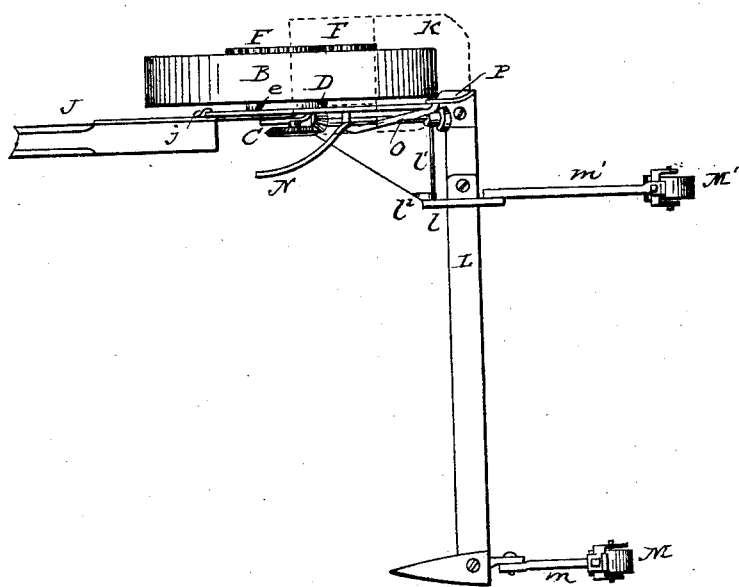

Figure 1 represents a view in elevation of my improved harvester as it appears when used as a mower. Fig. 2 represents a plan or top view of the same. Fig. 3 represents a similar view of the mechanism, on an enlarged scale, as it appears when adapted to use as a horse-power. Fig. 4 represents a transverse section through the same at the line $x\,x$ of Fig. 3; and Fig. 5 represents a view of the lifting apparatus, the bed-plate, and a portion of the gearing.

My invention relates more especially to that class of harvesters of which some of the mechanism is capable of adaptation to use as a horse-power; and to this end the improvement herein claimed consists, first, in so combining the frame, the tongue, the driving-wheel, and the gearing of a harvester as to secure their effective operation, while at the same time their construction is such as to admit of their adaptation to use as a horse-power without substitution, as hereinafter shown; secondly, in a flanged metal gear-frame or bed-plate, cast in one piece, and having mounted upon it the driving-wheel, the gearing, the driver's seat, and the lifting mechanism, as hereinafter more fully shown; thirdly, in mounting the driving-wheel and all the gearing on a single solid-metal bed-plate, substantially as hereinafter described, so as to secure a firm bearing for the mechanism, while permitting it to be used either as a harvester or horse-power without alteration; fourthly, in combining a stationary toothed ring on the main axle with planetary gears on the driving-wheel, so as to drive the crank-shaft through the main axle; fifthly, in a novel method of throwing the mechanism into and out of gear; sixthly, in so constructing the tongue of a harvester that it may be used as a sweep when the machine is converted into a horse-power.

In the accompanying drawings, which represent a convenient arrangement of parts for carrying out the objects of my invention, the machine is shown as consisting mainly of a flanged metal frame or bed-plate, A, supported on a driving-wheel, B, by an axle, $b$, fixed to the bed-plate. This axle is hollow, and has a flange or button, $b'$, on it, fitting close up to the bed-plate, as shown in Figs. 4 and 5. A recess, $c$, is cut in the edge of this flange, to receive the toe $c'$ of a bent lever, C, which extends to a point near the foot of the driver when in his seat. An externally-geared spur-wheel or toothed ring, D, rotates freely on this flange as a center, and has ratchet-notches, $d$, cut in its inner periphery, into which notches the toe $c'$ takes and holds the rings stationary when the machine is moving forward. The weight of the lever C is sufficient to hold the ring in gear. The shape of the notch, however, is such that when backing the ring rotates freely. The ring can be thrown out of gear at any time by raising the lever C, so as to free the toe from the notch.

One or more driving-shafts, E, are mounted in bearings, in this instance cast in one piece with the arms of the driving-wheel.

A small spur-pinion, $e$, mounted on the driving shaft, and turning with it, gears into the driving-ring D and traverses round it with a planetary motion.

The driving-shaft carries on its other end a spur-wheel, F, which gears into and travels round a small spur-pinion, $g$, mounted on a counter-shaft, G, which passes through the tubular axle $b$, and carries on its inner end a bevel-wheel, H, which drives a corresponding pinion, $i$, on the crank-shaft I.

The tongue J has a hook, $j$, on its rear end, which encircles the axle $b$, and a flange, $j$, on its side, which embraces the front edge of the bed-plate A, which is curved in the arc of a circle of which the axle $b$ forms the center. The tongue is thus free to play vertically, but not laterally.

The driver's seat K consists of a saddle astride of the driving-wheel, and supported by a standard, $k$, bolted to the bed-plate, and having a flange upon it like that on the tongue, which flange embraces the top of the bed-plate, which is likewise curved in the arc of a circle of which the screw $k'$ (which supports the driver's seat) is the center, which arrangement allows the seat to be moved backward and forward to balance the machine, as occasion requires.

In order that the driver may ride more comfortably, a plate-spring, $k^2$, is bolted to the back of the standard $k$, and rests against a projection on the bed-plate. This plan I have found by experiment to be better than supporting the seat by an S-shaped or spiral spring.

The bed-plate A is narrowed vertically and widened laterally at it rear end, as shown in the drawings, so as to form a broad shoe to ride over the cut grass, and is provided with lugs $l^2$, through which and through corresponding lugs, $l$, on the finger-beam a rod, $l'$, passes, to form a hinged joint.

The finger-beam L may be of any suitable construction, and is to be provided with a suitable cutting apparatus.

Caster-wheel M M' are mounted on arms $m$ $m'$, jointed to the finger-beam in such manner as to permit of their rising and falling in a vertical direction, and of their being held in any desired position by clamp-screws.

The finger-beam is raised and lowered by a hand-lever, N, pivoted to the bed-plate, and connected by a brush, $o$, to a standard, P, on the end of the finger-beam, which standard has a series of holes in it, into which the hook of the link O may be inserted to vary the range of motion of the finger-beam.

The following is the operation of the machine as a mower: As the machine advances the spur-pinion $e$ travels around the stationary toothed ring D, and is rotated by it. The wheel F on the other end of this shaft drives the pinion $g$ on the counter-shaft G, which carries the bevel-wheel H, which in turn drives the crank-shaft I.

When used as a harvester the machine is of course to be provided with a suitable platform, reel, and raker's stand; or an automatic rake may be applied. The rake may ride on the end of the finger-beam, as in McCormick's machine, or in any other suitable place.

To adapt the machine to use as a horse-power, the driver's seat, tongue, lifting-lever, and finger-beam are detached from the bed-plate A, which is then laid down upon its side, so that the driving-wheel shall lie above the frame. The projecting portions of the bed-plate rest in grooves cut in the blocks, so as to hold the frame firmly in position, as shown in Fig. 3. The tongue is then hooked on a pin, $j^2$, on the driving-wheel, and a hook, $j^3$, pivoted on the inner periphery of the driving-wheel, is inserted into a hole in the tongue to hold it securely. The horses are then harnessed to the outer end of the tongue as a sweep, and the machine is ready for operation as a horse-power. If greater power be required, more sweep may be added by merely duplicating the arrangements above described. The power may be communicated to the mechanism to be driven either by a band from the driving-wheel or by attaching a pitman or universal joint to the crank-shaft.

The advantages of my improvement are obvious, as by it the farmer obtains both a harvester and a portable horse-power at the price of a harvester alone. A harvester can only be used a short time in each year; but a horse-power is always in demand. It will likewise be observed that all parts of the machine are mounted upon or connected with the bed-plate, which consists of a single solid plate of metal, which mode of construction insures a firm support for the gearing, and consequently prevents it from binding or straining, and likewise permits the parts readily to be taken apart or put together again.

From the foregoing description it will be seen that the only change necessary to connect the machine from a mower to a horse-power is to remove the driver's seat and finger-beam, to lay the machine on its side, and to alter the position of the tongue.

What I claim therein as new, and desire to secure by Letters Patent of the United States, is—

1. The combination of the frame, the driving-wheel, the gearing, and the tongue, substantially in the manner described.

2. The bed-plate or gear-frame A, when constructed and arranged to operate as described.

3. The combination of the driving-wheel and gearing with the bed-plate, when arranged for joint operation as set forth.

4. The combination of the stationary toothed ring D with the planetary gear, as described, for the purpose of driving the crank-shaft through the tubular axle of the driving-wheel, as set forth.

5. The combination of the foot-lever C, the toothed ring D, and the flange $b'$, substantially in the manner described, for the purpose of throwing the mechanism into and out of gear, as set forth.

6. The tongue constructed, substantially as described, for the purpose of allowing it to be changed from a tongue for a harvester to a sweep for a horse-power, or vice versa, as specified.

In testimony whereof I have hereunto subscribed my name.

JOHN BARNES.

Witnesses:
EDWARD H. GRIGGS,
JAMES R. BROWN.